3,080,447
INORGANIC SHIELDED CABLE TERMINATION SYSTEM
George E. Lusk, Downers Grove, and James H. Nicholas, Flossmoor, Ill., assignors to G & W Electric Specialty Co., Blue Island, Ill., a corporation of Illinois
Filed Feb. 8, 1961, Ser. No. 87,846
6 Claims. (Cl. 174—73)

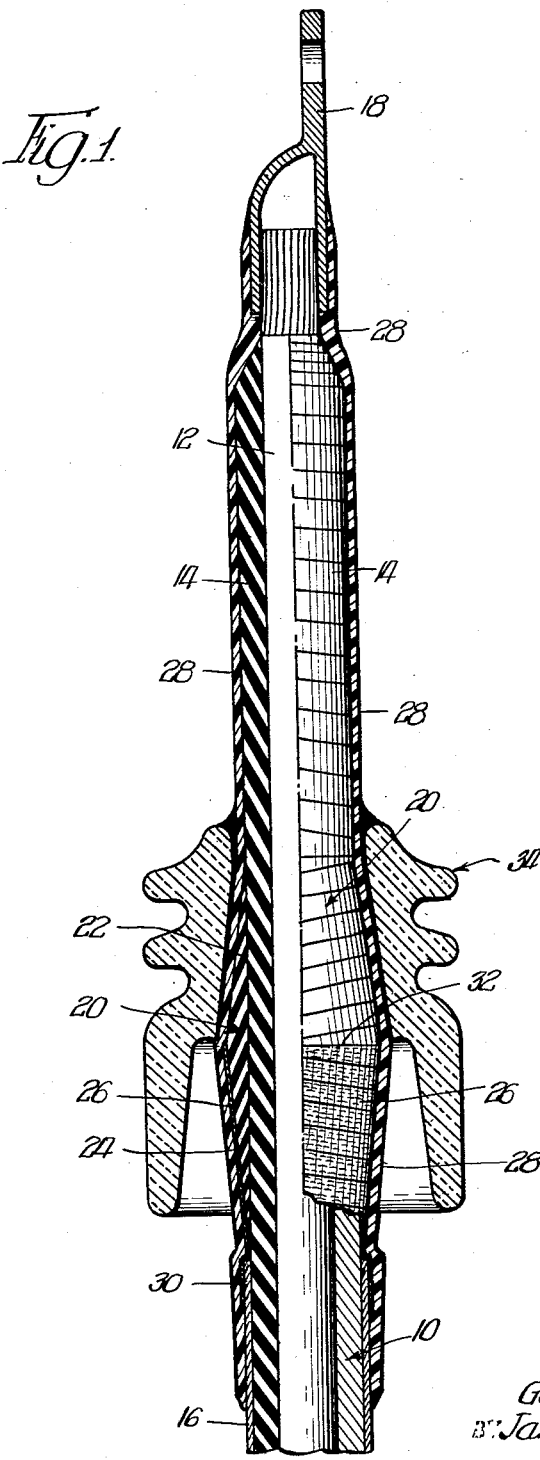

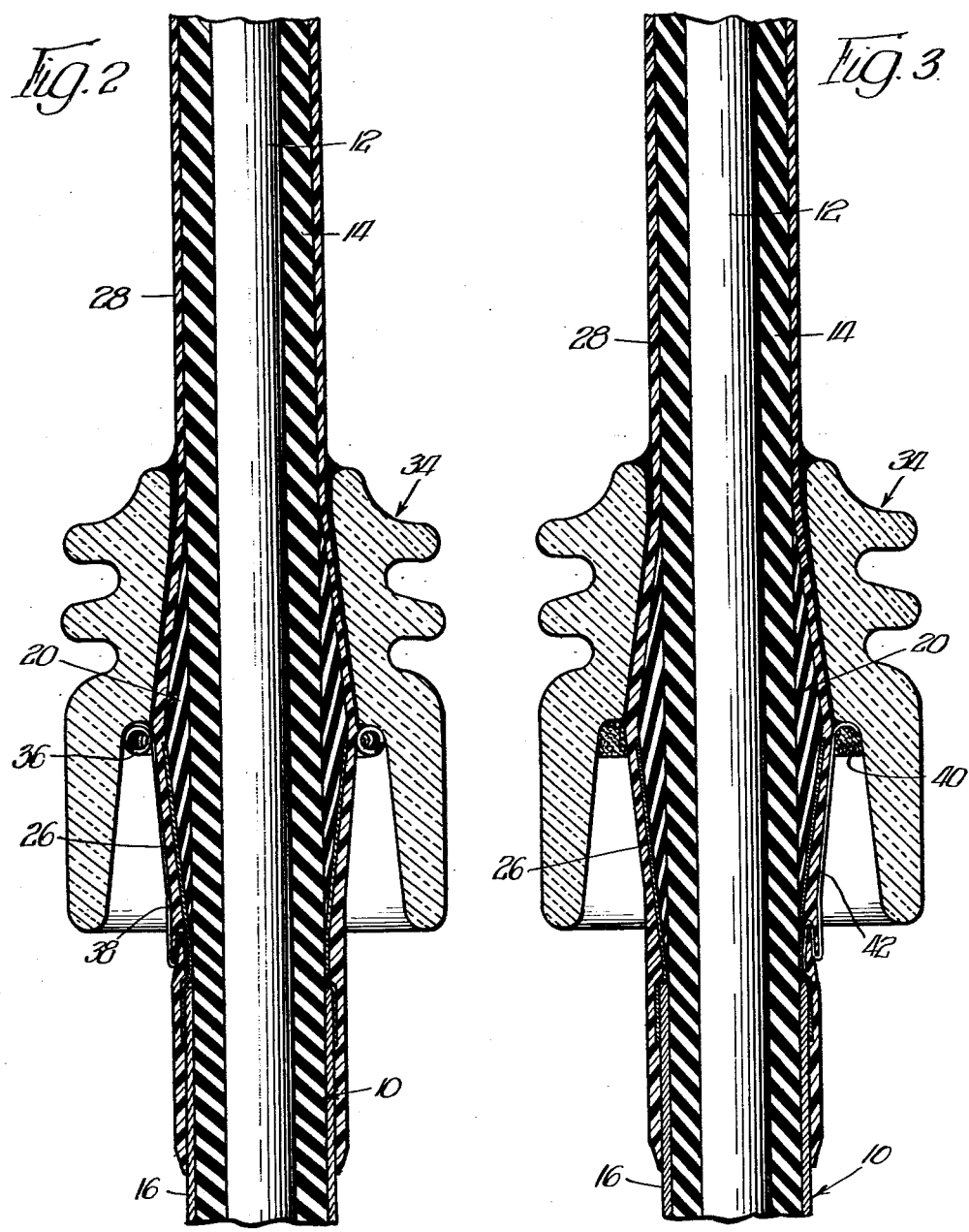

The invention relates to termination structure for electric power cables and has reference more particularly to a termination device which is applicable to those power cables that employ an over-insulation shielding system comprised of either a metallic sheath and/or metalized or metallic shielding tapes wound around the cable insulation.

The cable insulation types deemed applicable to the termination principle of the invention include the plastic insulated cables, the rubber or rubber like insulated cables, the varnished cambric and the so-called solid type paper insulated cables. The class of cables usually paper insulated and referred to as low pressure, medium pressure or high pressure would usually not utilize this construction; however, they should not be excluded from the scope of the present improvement.

The electrical stresses in shielded type cables other than at the ends or joining areas are radial in nature. This eliminates the need to maintain high longitudinal dielectric strength in the insulation used. However, in the case of the cable ends where the shielding or metallic sheath structure is removed from around the cable insulation, high longitudinal voltage gradients may occur and as a consequence particular attention must be paid to the surface or interface strengths of the dielectric systems used.

The basic system that has been used to date to minimize the longitudinal gradients on the cable surface at the end of the shielding, has been the stress relief cone. The stress relief cone has the shape of a double ended cone and is generally fabricated of turns of tape insulation compatible with the cable insulation system, with the cone adjacent to the cable shielding being covered with a conductive material usually of tape form and connected to the cable shielding. Thus the termination shielding edge is transferred from the cable surface to the crest of the stress relief cone insulator and is accordingly augmented in diameter.

Control of the slope of the stress cone and its thickness allows the designer to control the longitudinal gradients of the insulation to an acceptable value. This structure corrects excessive longitudinal gradients on the cable insulation surface, but unfortunately it transfers the problem from that on the surface of the cable to the air insulation interface at the top edge of the stress relief cone shielding tape or electrode. Unless the stress relief cone is of large diameter, or a belt of insulation is applied over the stress relief cone, the longitudinal gradients existing in this area can in time erode or carbonize the organic insulation from which the stress cones are fabricated.

Even when a belt of insulation is applied, the situation is aggravated when the surface of the insulation becomes contaminated by atmosphere carried contaminates such as carbon, sulphur deposits, other industrial waste by-products and salt in those cases where the termination device is located near coastal regions. Even in these cases, if the diameter of the stress cone is made large enough to be acceptable in a clean condition, the contamination of the surface could render the design unacceptable.

In order to eliminate the tracking or erosion problem at the stress cone crest it has been customary to use a pothead. However, potheads and devices of this nature are expensive to install and they present a problem in obtaining void-free filling of the space between the ceramic body portion of the pothead and the cable termination structure. Voids in the filling compound are undesirable since these low pressure gas occlusions form zones of very low dielectric strength and of consequence become the initial points of ionization.

An object of the present invention is to provide a cable termination structure which will utilize in the high gradient air interface areas the non-tracking type material characteristic of materials used for potheads and wherein said termination structure will be relatively simple and economical to install.

Another object of the invention is to provide a cable termination structure wherein the problem of obtaining void-free filling is reduced to a minimum if not completely eliminated.

Another object resides in the provision of an improved termination device for the type of cables as described and wherein tape of the open weave type and which is bonded by a non-hygroscopic resin is applied to the stress relief cone and to any exposed cable insulation so as to form a non-hygroscopic barrier for the termination device.

Another object is to provide a termination device for power cables as described, wherein an insulating shell of porcelain, glass or other suitable inorganic material is supported by the upper portion of the stress relief cone in telescoping relation therewith and wherein the shell is intimately bonded to the said portion of the cone by a suitable resin.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a longitudinal sectional view taken substantially centrally of a power cable and illustrating the details of the present termination device;

FIGURE 2 is a fragmentary sectional view taken longitudinally of a cable and illustrating a modified form of termination device coming within the invention; and FIGURE 3 is a fragmentary sectional view taken longitudinally of a cable and illustrating another modified form of termination device coming within the invention.

Referring to the drawings, and particularly to FIGURE 1, the numeral 10 indicates a power cable including a conductor 12, cable insulation 14, and a metallic sheath 16. Thus the cable is of the type having an over-insulation shielding system. In order to receive the cable lug 18 and the termination structure of the invention, the cable insulation 14 is removed a short distance from the end to expose the bare conductor 12 and the sheath 16 is removed for a greater distance to expose a length of the cable insulation. In those cases where the cable has a jacket and a shielding system between the jacket and the cable insulation, both the jacket and the shielding system would be removed from the cable in a similar manner. Approximately ¾" more of the jacket is usually removed than the shielding to facilitate making the necessary electrical connections to the stress cone shielding system. The insulating materials used for the cable insulation, as regards power cables, can be divided into two groups. One group contains the hydrogscopic insulations such as oil impregnated paper or varnished cambric, and the second group contains the relatively non-hygroscopic insulations such as butyl, rubber, polyethylene, etc. The sheath 16 or outer jacket usually provides a moisture proof barrier, the most common material for the barrier is lead, although aluminum, steel, neoprene, polyvinylchloride and polyethylene have also been employed.

Since the protective sheaths have been removed, this end of the cable is thus exposed to atmospheric contamination. Also, due to removal of the sheath and/or shield, the maximum longitudinal voltage gradients impressed on the cable when in service will be increased. Accordingly, an adequate cable termination device must compensate for the reduction in the electrical and mechanical characteristics of the cable resulting from these procedures.

The first step in order to reinforce the cable insulation to compensate for any increase in the voltage gradients, resides in the provision of a stress relief cone 20 and which may consist of any standard type. The stress relief cone can be constructed by wrapping insulating tape around the cable insulation starting immediately above the cut edge of the cable sheath 16. The purpose of the stress relief cone is to increase the diameter of the cable shielding system to a point where the insulation can safely withstand the voltage gradients incurred at the shield edge. Of importance is the contour used to obtain the required diameter. Any abrupt change in contour, especially near the cut edge of the sheath, may result in the creation of gradients in excess of the insulation capabilities. The tape used for building the stress relief cone 20 should be compatible with the cable insulation. For paper or varnished cambric insulated cables, crepe paper, varnished cambric or tape formed of polyester resins may be used. The tape is applied half-wrapped to reduce registration problems. The resultant contour takes the shape of two regular cones in back-to-back relation and with each cone having a taper which may range from approximately four to seven degrees. The upper cone is indicated by the numeral 22 and the lower cone by the numeral 24. The tape is applied with a uniform and firm tension to obtain a dense and relatively void-free build-up.

The cable shield system is continued for the length of the lower cone by means of metalized tape such as copper tinsel braid, copper braid, or foil. This shield indicated by numeral 26 covers a portion of the sheath and/or cable shield such as 30, and the shield continues in an upward direction to the maximum diameter of the stress relief cone where the edge 32 is made uniform and free of any protruding braid strands.

In accordance with the invention the stress relief cone 20 and any exposed cable insulation 14 is covered with insulation 28 consisting of tape bonded by means of a relatively non-hygroscopic high insulation value synthetic resin. The tape employed may be of any open weave, non-hygroscopic fiber, wettable and chemically compatible with the companion resin system used. Such tape material may include material formed of glass fibers, nylon fibers, or fibers of polyester resins and other materials with similar wettability and non-hygroscopic characteristics. The resins should be of the room temperature curable type and relatively non-hygroscopic when set up in conjunction with the tape used. The resins should also exhibit suitable expansion and tension characteristics, and should be ultra-violet radiation resistant. The resins should also exhibit non-tracking properties to a high degree and should bond well to ceramic materials. Resins that have been satisfactorily used include the epoxides, polyurethane and other comparable resins.

It is preferred that the tape-resin complex be applied to the top portion of the cable sheath 16 and/or jacket cable shield system as to cover and bond with the metalized shielding 26, the said shielding having contact mechanically and electrically with the sheath and/or cable shield in the vicinity of 30. The said tape and resin covering continues upwardly to cover the stress relief cone 20 and also the remaining insulation of the cable up to and over the lower section of the lug 18.

The cable termination device of the invention is completed by the insulator 34 of ceramic or glass and which is so designed as to have telescoping relation with the cable and to nest on and be supported by the top cone 22. The insulator or insulating shell 34 may consist of a ceramic such as wet process or dry process porcelain, glass, or other suitable inorganic material. The shell is applied over the stress relief cone before the tape and resin insulation has solidified so as to form an intimate bond between the ceramic or glass insulator and the tape-resin covering.

The insulator 34, in addition to including dry and wet process porcelain, may be constructed of other ceramic-like materials including glass, alumina, and steatite. The materials in general should exhibit a non-carbon tracking characteristic, and the same should have good corona erosion characteristics. The surface of the insulator should also be of such a nature as to be relatively self-cleaning. In the case of ceramic materials this would presuppose the use of a glazed surface.

FIGURE 1 illustrates the basic elements comprising the termination device of the present invention for the type of power cables as previously mentioned. The ceramic insulator is shown without any auxiliary shielding being incorporated in or on it. Accordingly, as regards the devices of FIGURE 1 the termination shield edge is only that associated with the shielding edge of the stress relief cone proper.

In FIGURE 2 the termination device is the same as described, except that an electrostatic shield, flux control reference girdle has been incorporated in the ceramic insulator. In referring to said figure it will be seen that the cable 12 with insulation 14, stress relief cone 20, and cable shielding tape 26 are the same as described for FIGURE 1. Also, the termination structure is provided with a non-hygroscopic barrier 28 consisting of open woven tape bonded together in overlapping relation, and also bonded to the cable insulation by a non-hygroscopic resin. This form of the invention includes a metal coil spring or similarly formed metallic member 36 having location under the skirt of the ceramic insulator 34. The metallic member 36 is thus located in substantial horizontal alignment with the terminal edge 32 of the stress cone shielding tape 26.

The member 36 is, in turn, connected to the grounded shield system of the stress cone and cable by means of the metal strip conductor 38. The said metal conductor has contact at its lower end with the cable shield 26 and said conductor extends through the tape windings of the non-hygroscopic barrier to the exterior of the cable termination device. From the point where the conductor exits from the barrier, it extends upwardly and eventually connects at its upper end with the girdle 36. Consequently, the shield termination edge is intimate with the ceramic unit to thus assure that no excessive longitudinal gradients will exist in the organic complex.

The device of FIGURE 3 is substantially similar to that of FIGURE 2, with the termination device being made up of the same components as described. However, a basic distinction exists in the fact that the insulator 34 incorporates a shielding ring which differs, however, from the girdle of FIGURE 2. In this modification the inner surface underneath the skirt of the ceramic insulator is coated with a conductive glaze or metallic coating indicated by the numeral 40. The said coating is, in turn, electrically connected by the metal conducting strip 42 to the cable shielding and stress cone relief complex.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a power cable termination device, the combination with the terminal end of a cable having a portion of its exterior jacket and cable shielding system removed to expose the cable insulation and having a portion of the cable insulation removed to expose the bare conductor, of a terminal lug secured to the exposed end of the conductor, a stress relief cone located on a section of the cable insulation immediately above the terminal end of the jacket, a non-hygroscopic barrier composed of tape and a resin and providing a covering for the stress relief cone and for the remaining section of the cable insulation, and a ceramic insulator in telescoping relation with the stress cone and being supported on the upper portion of the stress relief cone, said insulator being bonded to said portion of the stress relief cone by the resin of the barrier.

2. In a power cable termination device, the combination with the terminal end of a cable having a portion of its exterior jacket and cable shielding system removed to expose the cable insulation and having a portion of the cable insulation removed at the cable end to expose the bare conductor, of a terminal lug secured to the exposed end of the conductor, a stress relief cone located on a section of the cable insulation immediately above the terminal end of the jacket, said stress relief cone comprising tape compatible with the cable insulation and wound on the same in overlapping relation to form a double ended cone structure, a non-hygroscopic barrier composed of tape and a resin and providing a covering for the stress relief cone and for the remaining section of the cable insulation, and a ceramic insulator in telescoping relation with the stress cone and being supported on the upper portion of the stress relief cone, said insulator being bonded to said portion of the stress relief cone by the resin of the barrier.

3. A power cable termination device as defined by claim 2, wherein the tape for the non-hygroscopic barrier is open weave tape of the class consisting of materials formed of glass fibers, nylon fibers, or fibers of polyester resins, and wherein the bonding resin is non-hygroscopic, of the room temperature curable type, having a high non-track characteristic and good bonding qualities as regards ceramic materials.

4. In a power cable termination system, the combination with the terminal end of a cable wherein the bare conductor is exposed at the tip end and wherein a section of the cable insulation is exposed from the bare conductor to the cut terminal end of the cable jacket, of a terminal lug secured to the bare end of the conductor, a stress relief cone located on a section of the cable insulation immediately above the terminal end of the jacket, said stress relief cone comprising tape compatible with the cable insulation and wound on the same in half lapping relation to form a double ended cone structure, a metallic shield comprising a covering for the lower portion of the stress relief cone, a non-hygroscopic barrier composed of tape and a resin and providing a covering for the stress relief cone including the metallic shield and for the remaining section of the cable insulation, and a ceramic insulator in telescoping relation with the stress cone and being supported on the upper portion of the stress relief cone, said insulator being bonded to said portion of the stress relief cone by the resin of the barrier.

5. A power cable termination system as defined by claim 4, additionally including a shielding ring of metal having location on the insulator and being approximately aligned with the upper terminal edge of the stress cone metallic shield, and a metal conducting strip electrically connecting the shielding ring on the insulator with the said metallic shield.

6. A power cable termination system as defined by claim 4, wherein the metallic shield consists of metallized tape wound in overlapping relation and covering the lower cone portion of the stress relief cone, and additionally including a shielding area comprising a metallized surface located on the insulator and under the skirt of the same, and a metal conducting strip electrically connecting the exterior area of metallized surfacing on the insulator with the interior metallic shield on the stress relief cone.

References Cited in the file of this patent
UNITED STATES PATENTS

| | | |
|---|---|---|
| 2,117,697 | Brandt | May 17, 1938 |
| 2,748,184 | Nicholas | May 29, 1956 |